(12) United States Patent
Telefus et al.

(10) Patent No.: US 6,765,774 B2
(45) Date of Patent: Jul. 20, 2004

(54) HIGH IMPEDANCE INSERTION SYSTEM FOR BLOCKING EMI

(75) Inventors: Mark D. Telefus, Orinda, CA (US); Anatoly Shteynberg, San Jose, CA (US)

(73) Assignee: iWatt, Inc., Los Gatos, CA (US)

( * ) Notice: Subject to any disclaimer, the term of this patent is extended or adjusted under 35 U.S.C. 154(b) by 83 days.

(21) Appl. No.: 10/159,364

(22) Filed: May 31, 2002

(65) Prior Publication Data

US 2003/0123203 A1 Jul. 3, 2003

Related U.S. Application Data

(60) Provisional application No. 60/344,730, filed on Dec. 28, 2001.

(51) Int. Cl.[7] .................................................. H02H 9/00
(52) U.S. Cl. ..................................................... 361/58
(58) Field of Search ............................ 361/58, 111, 118

(56) References Cited

U.S. PATENT DOCUMENTS

| | | | |
|---|---|---|---|
| 4,514,646 A | * 4/1985 | Ando et al. ................. 327/546 |
| 4,691,263 A | * 9/1987 | Kenny et al. ................. 361/58 |
| 4,870,534 A | * 9/1989 | Harford ........................ 361/58 |
| 5,784,238 A | 7/1998 | Nering et al. ................. 361/65 |
| 6,108,181 A | * 8/2000 | Gerosa ........................ 361/56 |
| 6,259,589 B1 | 7/2001 | Chao .......................... 361/119 |

* cited by examiner

Primary Examiner—Hung V. Ngo
(74) Attorney, Agent, or Firm—MacPherson Kwok Chen & Heid LLP

(57) ABSTRACT

A high-impedance-insertion system suppresses load-produced electromagnetic noise from interfering into a power source by coupling the load to the power source through a switch. If the power source is an AC power source, the switch couples to the power source through a storage element and a rectifier, such that the switch is OFF (in the high impedance state) when the rectifier is reversed biased (or in a low impedance state). If the power source is a DC power source, the switch couples to the power source through a storage element and a second switch, such that the switch is OFF (in the high impedance state) when the second switch is ON (in the low impedance state).

14 Claims, 8 Drawing Sheets

HIGH IMPEDANCE INSERTION SYSTEM FOR BLOCKING EMI

RELATED APPLICATION

This application claims the benefit of U.S. Provisional Application No. 60/344,730, filed Dec. 28, 2001, the contents of which are incorporated by reference herein.

FIELD OF INVENTION

This invention relates to the suppression of electromagnetic interference (EMI) using solid state components.

BACKGROUND

Many power supply systems generate EMI at unacceptable levels, requiring additional elements for the purpose of suppressing or removing the generated EMI. For example, a switching power supply plugged into a conventional power outlet generates RF noise as its power switch cycles on and off repeatedly. To the power outlet, this RF noise is unwanted "pollution" that will interfere with the operation of other nearby electronic components. As a result, manufacturers of electronic components often must certify that their products' EMI levels fall below maximum acceptable limits, i.e., satisfy electromagnetic compatibility (EMC) standards.

Given that many components unavoidably generate EMI, it is a common practice to introduce an EMI filter between such components and the AC power lines so as to satisfy EMC standards. EMI filters generally employ reactive elements (capacitors or inductors). Accordingly, conventional EMI filters may incorporate common-mode chokes, differential chokes, line-to-line or across-the-line X capacitors, and line-to-ground Y capacitors. Regardless of the type of EMI filter used, the desired result is a filter whose transfer function suppresses the expected noise spectrum in the frequency domain. This can be quite difficult as the noise spectrum can vary with conditions such as application load, input power and voltage levels, temperature, component age, PCB layout, switching frequency, power supply topology, etc. The difficulty of EMI filter design is compounded by the expense of the EMI filter components. Capacitors and inductors are inherently expensive, and their energy storage capabilities are not easily reproduced with inexpensive solid-state components.

Consequently, what is needed is an alternative to an EMI filter, built of inexpensive solid-state components that can be incorporated with minimal design effort into any power supply application.

SUMMARY

A high impedance insertion system incorporating a bi-state device having a high-impedance state and a low-impedance state couples between a power source and a load capable of producing EMI. By cyclically alternating between the high-impedance state and the low-impedance state, the system blocks load-produced EMI from coupling to the power source.

In accordance with one embodiment of the invention, the high impedance insertion system includes a full-wave rectifier circuit for receiving an AC input from an AC main power source. Depending on the instantaneous value of the AC input voltage, the rectifier circuit cyclically alternates between being forward biased and being reversed biased. When the rectifier circuit is forward biased, a low impedance path permits EMI from the load to be conductively coupled to the AC mains. Conversely, when the rectifier circuit is reversed biased, high impedance between the load and the AC mains prevents conductive coupling of EMI to the AC mains. During the periods of time when the rectifier circuit is forward biased, the high impedance insertion system places the bi-state device in the high-impedance state, thus blocking EMI from being transmitted to the AC mains.

DESCRIPTION OF THE DRAWINGS

FIG. 2a is a block diagram of the high impedance insertion system of FIG. 1a.

FIG. 3 shows voltage and current waveforms as well as timing data for the system of FIG. 2a.

FIG. 4b shows timing data for the controller of FIG. 6a.

FIG. 5a illustrates a partitioning of the high impedance insertion system of FIG. 2a.

FIG. 5b illustrates an alternative partitioning of the high impedance insertion system of FIG. 2a.

FIG. 7 illustrates an alternative partitioning of the high impedance insertion system of FIG. 2a.

FIG. 8 illustrates an alternative partitioning of the high impedance insertion system of FIG. 2a.

FIG. 9 illustrates an alternative partitioning of the high impedance insertion system of FIG. 2a.

DETAILED DESCRIPTION

Many EMI-producing loads require a DC input as a power source. To power such loads from an AC main thus requires rectification using active devices such as diodes. An important feature of AC main rectification is that the resulting rectified output current is time multiplexed with respect to the biasing of the active devices, i.e, the rectified output current cycles between periods of substantially no current when the devices are reverse biased (high impedance state) and periods of relatively high current when the devices are forward biased (low impedance state). The inventors have discovered that EMI from a load coupled into the AC main through such a rectifier enters primarily during the periods when the devices are forward biased (in the low impedance state). Given such a time dependence to EMI coupling, the present invention uses solid state components that bar EMI and other noise produced by a load from coupling into the AC mains during these periods of current flow. This time-based approach stands in sharp contrast with the frequency domain approach employed by conventional EMI filters, which function by using an appropriate transfer function. The present invention does not act to filter EMI in the frequency domain, but instead alternates in the time domain between a high-impedance state and a low-impedance state. Accordingly, the present invention may be implemented with a high impedance insertion system configured to be a barrier to EMI by alternating appropriately between the high impedance and low impedance states.

Figure 1A:
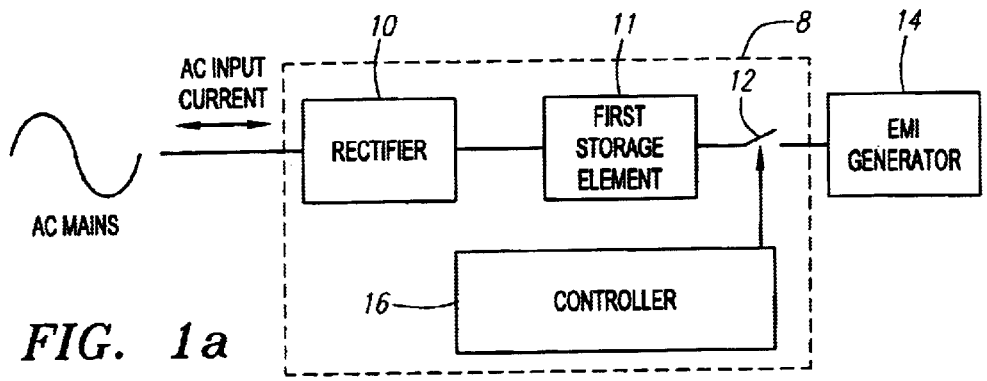
FIG. 1a is a conceptual block diagram of a high impedance insertion system for blocking EMI from coupling to an AC power source according to one embodiment of the invention.

Referring now to the drawings, FIG. 1a is a conceptual block diagram of a high impedance insertion system 8 coupled between an AC main and a load 14. The load 14 couples to the AC main through rectifier 10, a first storage element 11, and a switch 12. Rectifier 10 can be made up of diodes, solid state transistors, or other solid state devices (i.e. triacs). A high impedance insertion controller 16 monitors the state of rectifier 10 and switch 12 and insures that when rectifier 10 is in its low impedance (conducting) state, the switch 12 is OFF (high impedance state). With switch 12 OFF and rectifier 10 in the low impedance (conducting) state, energy is allowed to flow from the AC main to the first storage element 11, even as load 14 is electrically isolated from the AC main. Conversely, when switch 12 is ON, load 14 may receive power from first storage element 11. This high impedance periodically inserted between load 14 and the AC main by high impedance insertion system 8 substantially reduces EMI from coupling to the AC main. Because switch 12 has both a high impedance state and a low impedance state, it is an example of one type of a bi-state device suitable for implementation in high impedance insertion system 8.

The principles of the present invention may also be used to prevent EMI from coupling to a DC source. For example, turning now to FIG. 1c, a conceptual block diagram for a high impedance insertion system 7 coupled between a DC source and a load 14 is illustrated. In this embodiment, load 14 couples to the DC source through a switch 9, first storage element 11, and switch 12. Controller 17 monitors the states of switch 9 and switch 12, and insures that when switch 9 is ON (low impedance state), switch 12 is OFF (high impedance state). With switch 12 OFF and switch 9 ON, energy is allowed to flow from the DC source to the first storage element 11, even as load 14 is electrically isolated from the DC source. Conversely, when switch 12 is ON, load 14 may receive power from first storage element 11. This high impedance periodically inserted between load 14 and the DC source by high impedance insertion system 7 substantially bars EMI produced by load 14 from coupling to the DC source.

Figure 2A:
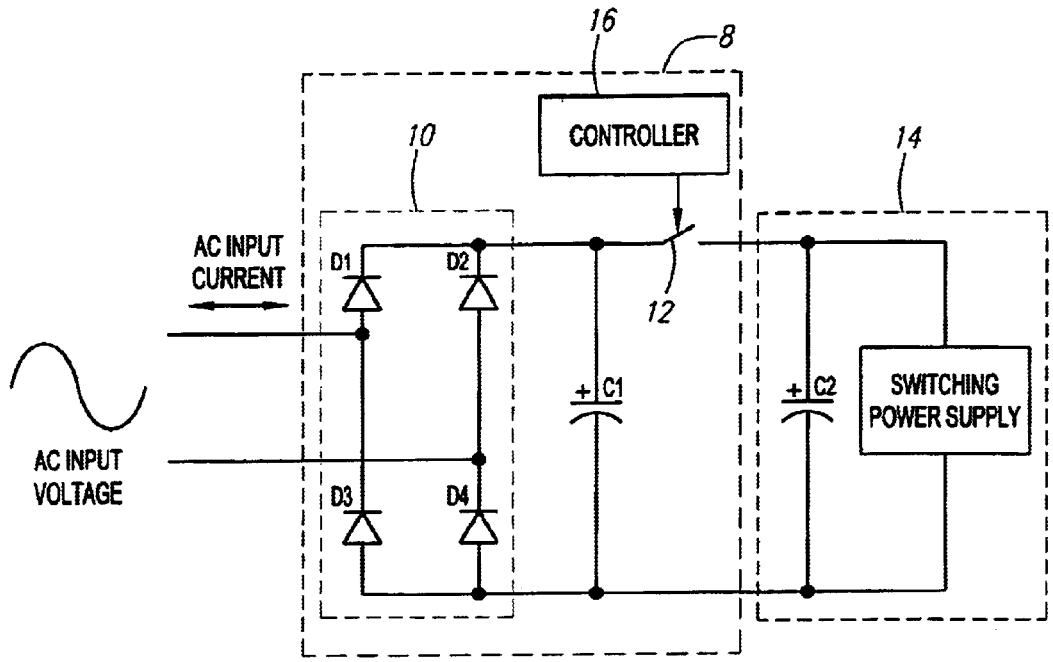
Figure 2B:
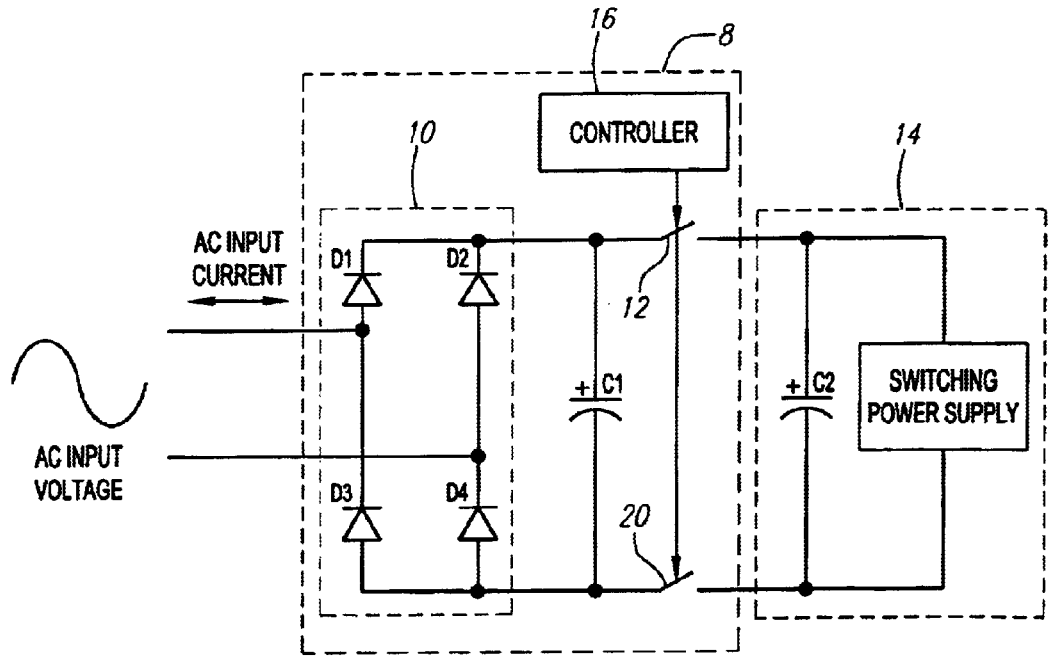
FIG. 2b is a block diagram of the high impedance insertion system of FIG. 2c.
Figure 3:
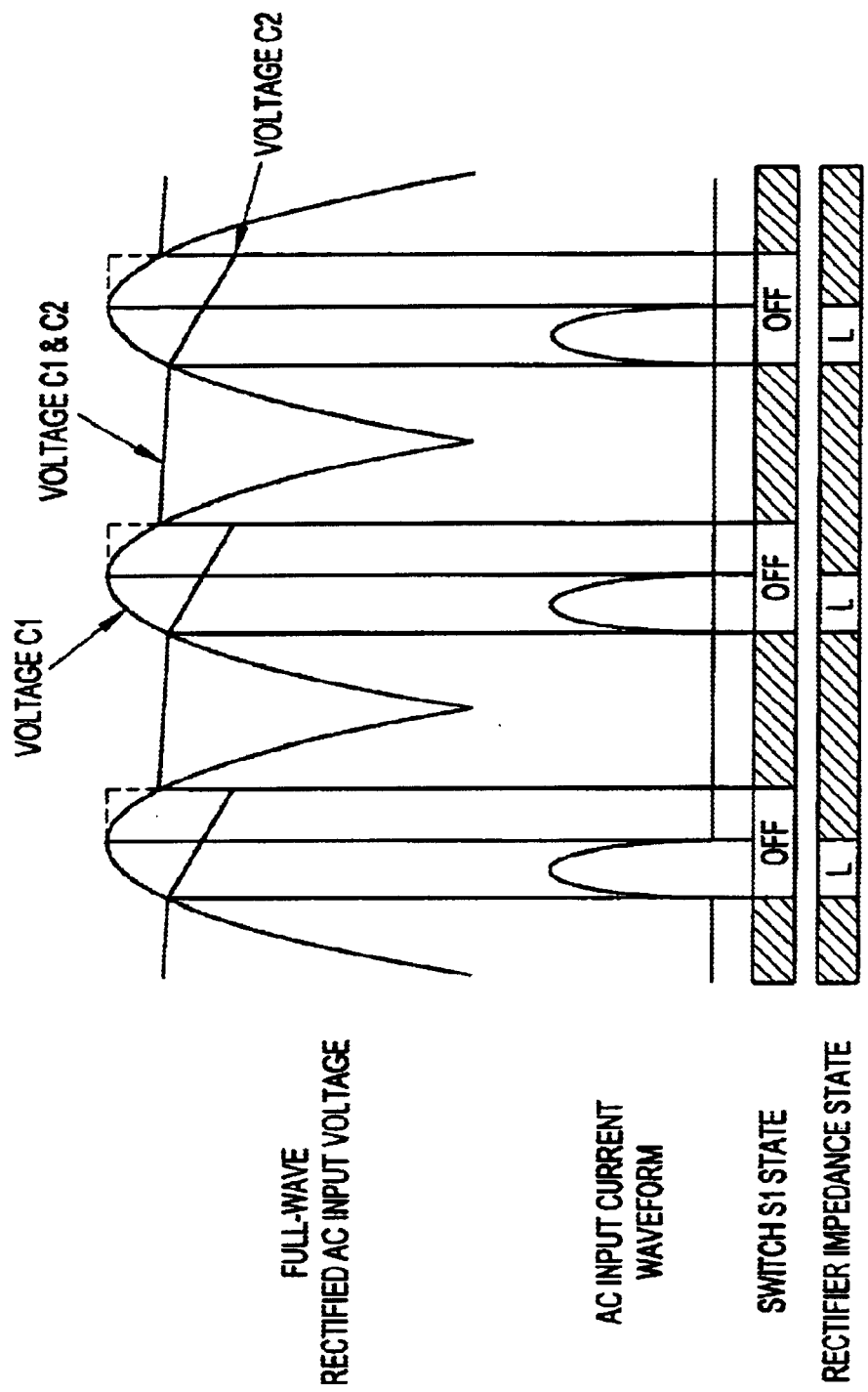

FIGS. 2a and 2b describe specific implementations for high impedance insertion system 8 of FIG. 1a. In FIG. 2a, rectifier 10 comprises a diode bridge rectifier formed by diodes D1 through D4 and first storage element 11 comprises capacitor C1. Switch 12 is controlled by controller 16 as described previously. Diodes D1 through D4 act to fill wave rectify the AC input voltage carried on the AC main and couple this rectified voltage to capacitor C1. Because capacitor C1 charges from this rectified voltage (and discharges to load 14), there will be a period during each AC half cycle that diodes D1 through D4 are reversed biased and a period that a pair of diodes from diodes D1 through D4 are forward biased. This behavior is illustrated in FIG. 3 which presents the rectified AC input voltage from rectifier 10, the voltage across capacitor C1, and the AC input current. In FIG. 3, the reversed biased periods (high impedance) for rectifier 10 are labeled "HIGH"; the forward biased (low impedance) periods for rectifier 10 are labeled "L." The resulting state of switch 12 is denoted in FIG. 3 as either ON or OFF. Load 14 includes a capacitor C2 which may provide power during those periods when switch 12 is OFF.

Controller 16 monitors the state of diodes D1 through D4 in rectifier 10 and insures that when rectifier 10 is in its low impedance (conducting) state, switch 12 is OFF (high impedance state). With switch 12 OFF and rectifier 10 in the low impedance (conducting) state, energy is allowed to flow from the AC main to capacitor C1, even as load 14 is electrically isolated from the AC main. Conversely, controller 16 insures that when rectifier 10 is in its high impedance state, switch 12 is ON. With switch 12 ON, load 14 may receive power from capacitor C1. This high impedance periodically inserted between load 14 and the AC main by switch 12 substantially reduces EMI from coupling to the AC main.

As discussed above, during those portions of each AC half-cycle in which a diode pair from diodes D1 through D4 is forward biased, noise generated by load 14 may possibly conduct through the forward-biased diode pair, into the AC main. This forms the primary component of the EMI associated with load 14. Careful design ensures that at no time does load 14 directly couple to the AC main; i.e., either switch 12 is OFF or all four diodes D1–D4 are reversed biased or both of the foregoing are true. Thus, the high impedance of either the opened switch 12 or the reverse-biased diodes D1–D4 or the combination of these two prevents EMI generated by load 14 from coupling into the AC main. Rather than be generated by load 14, EMI will be generated primarily by the charging of capacitor C1 and by the operation of diodes D1–D4 and switch 12.

Figure 4A:
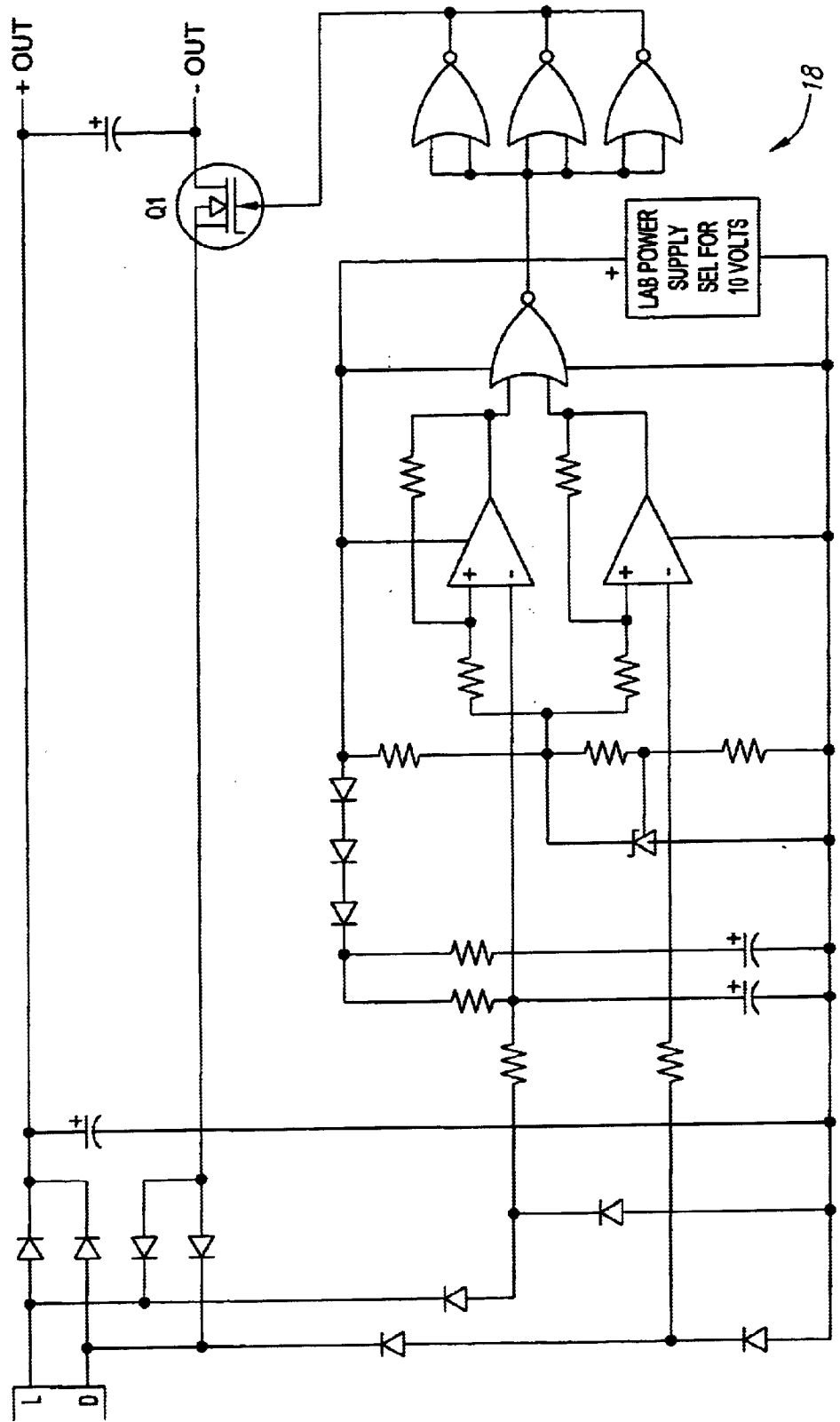
FIG. 4a is a schematic diagram for a controller according to one embodiment of the invention.
Figure 4B:
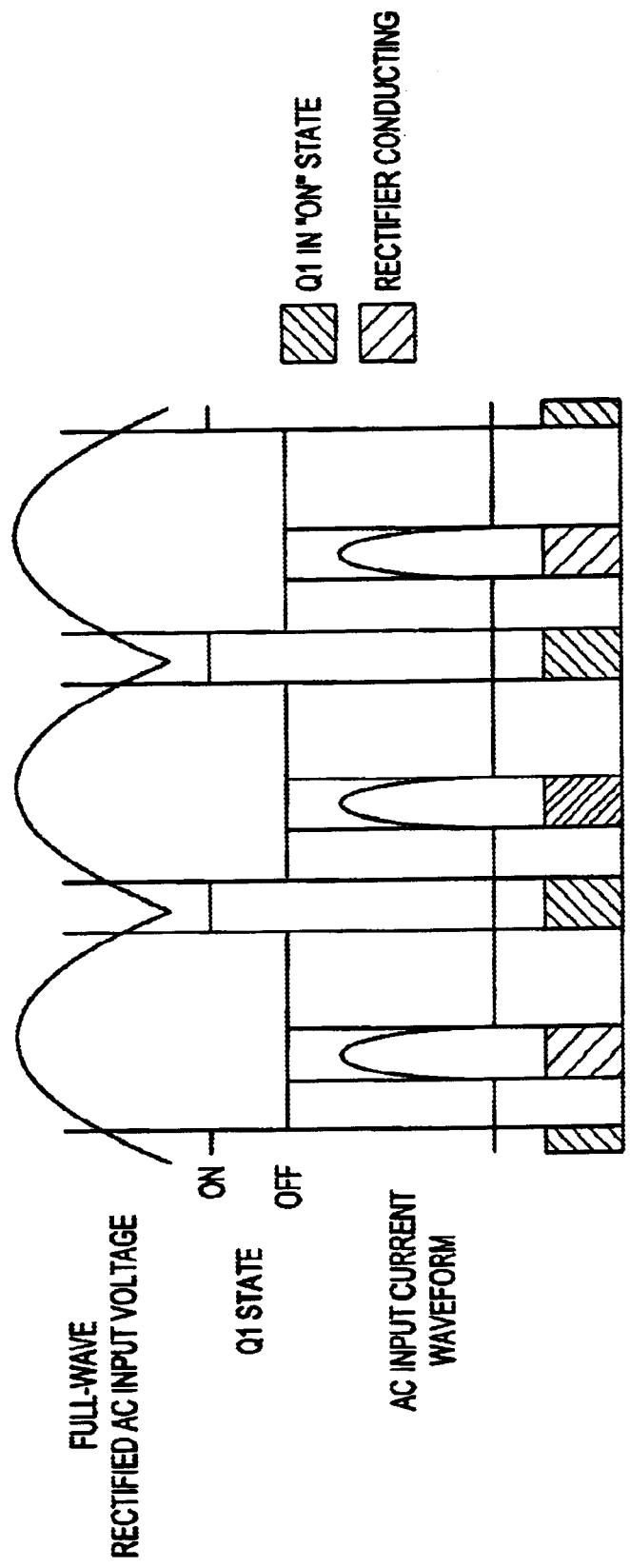

It will be appreciated that although switch 12 is shown on the positive rail coupling capacitor C1 and capacitor C2, it could also be located on the ground rail. Alternatively, an additional switch 20 for the ground rail in addition to switch 12 on the positive rail could also be used as seen in FIG. 4b.

The high impedance insertion controller 18 may be implemented in many different ways. Turning now to FIG. 4a, a schematic diagram for one embodiment of controller 18 is illustrated. Diodes D1 through D4 form a diode bridge rectifier as in FIG. 2a. Switch 12 is formed by a FET Q1. The controller includes two comparators to detect when the AC input waveform crosses zero. An RC time constant provides a window around each zero voltage crossing. This window around the AC zero voltage crossing determines when Q1 can be turned "ON" to allow the energy from capacitor C1 to be transferred to the load, and for the voltage across C1 and C2 to be greater than the AC input voltage. This insures that there is a high impedance path between the load and the AC mains. The timing diagram and resulting waveforms are shown on FIG. 4b. As shown in FIG. 4b, the region where the rectifier circuit is in the conducting state and the region where FET Q1 is "ON" should not intersect.

It will be appreciated that other implementations of controller 18 could be constructed to detect changes in rectifier impedance state by monitoring the voltage across capacitor C2 in load 14. Moreover, although capacitor C2 is shown integrated with load 14, it may be a discrete component with respect to load 14.

Figure 5A:
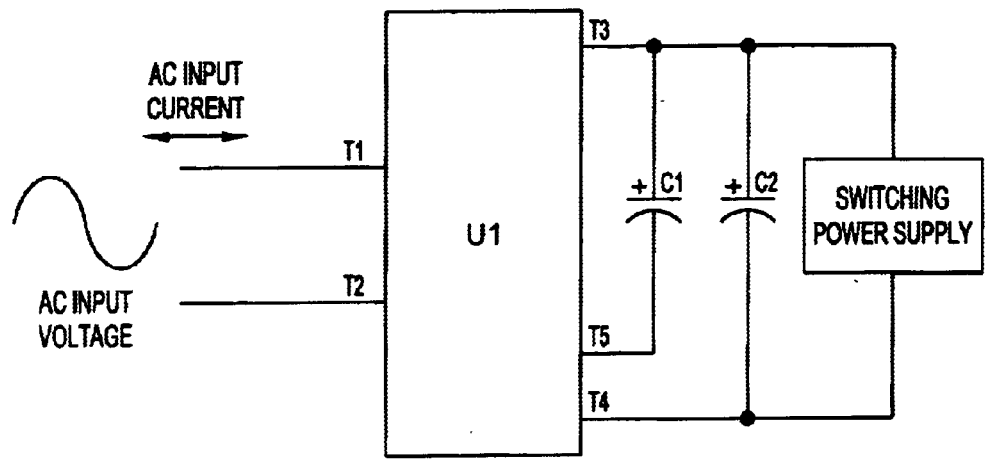
Figure 5B:
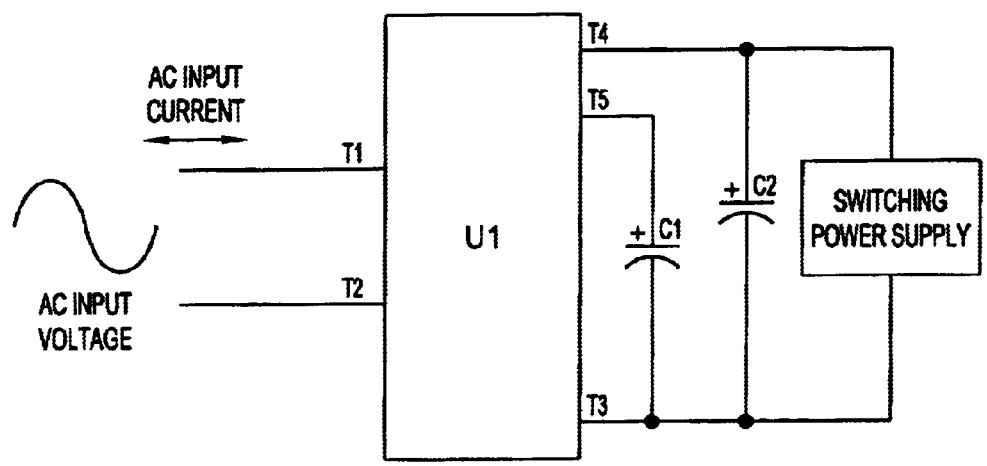
Figure 6:
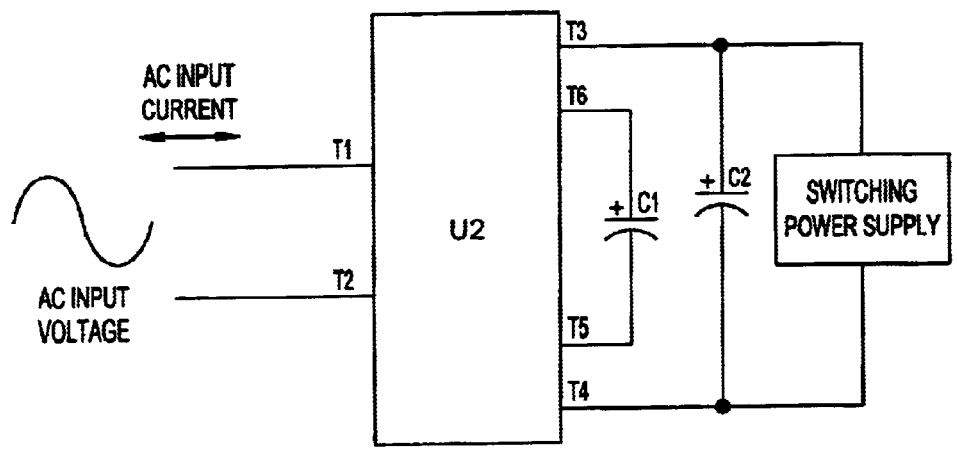
FIG. 6 illustrates a partitioning of the high impedance insertion system of FIG. 2c.
Figure 7:
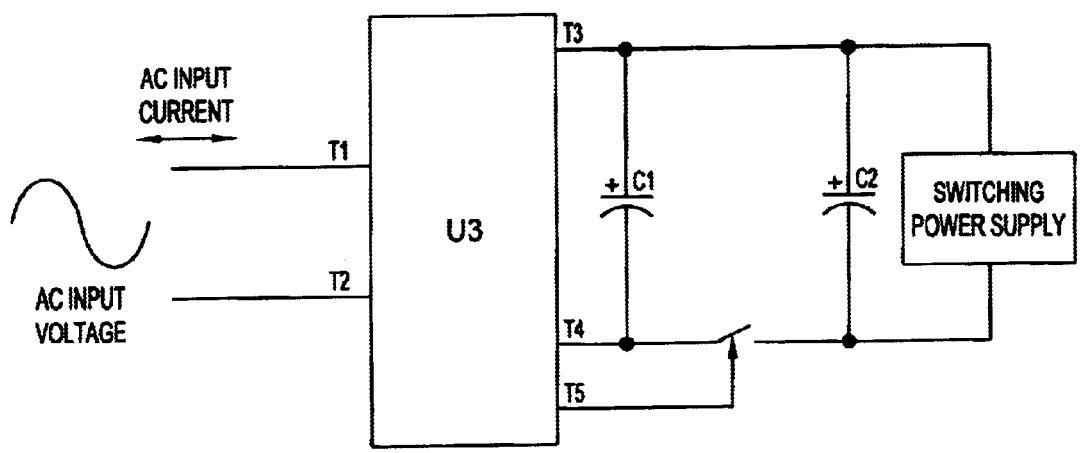
Figure 8:
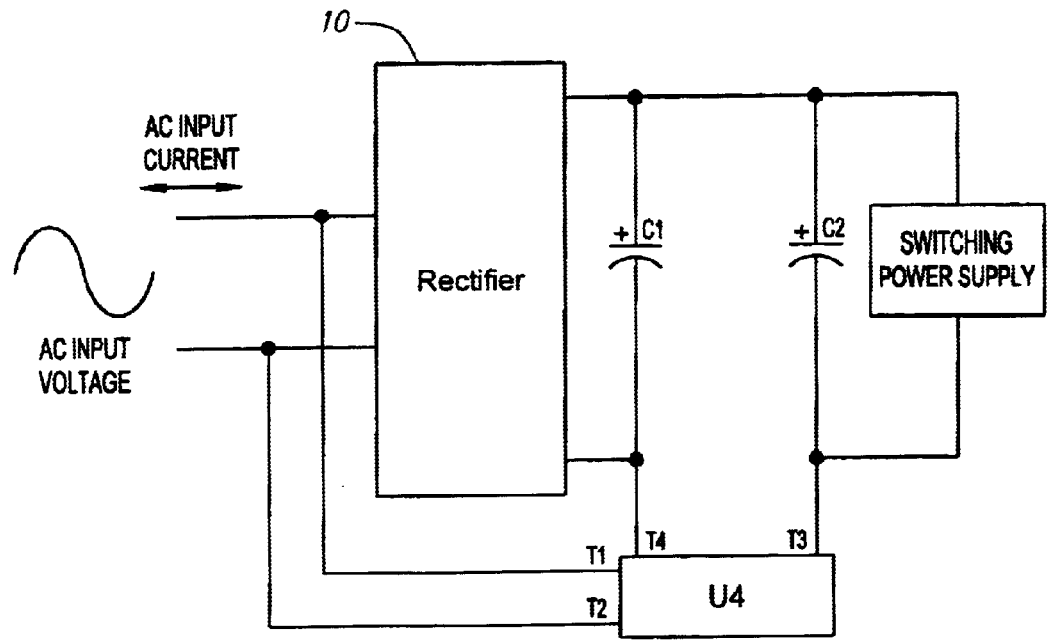
Figure 9:
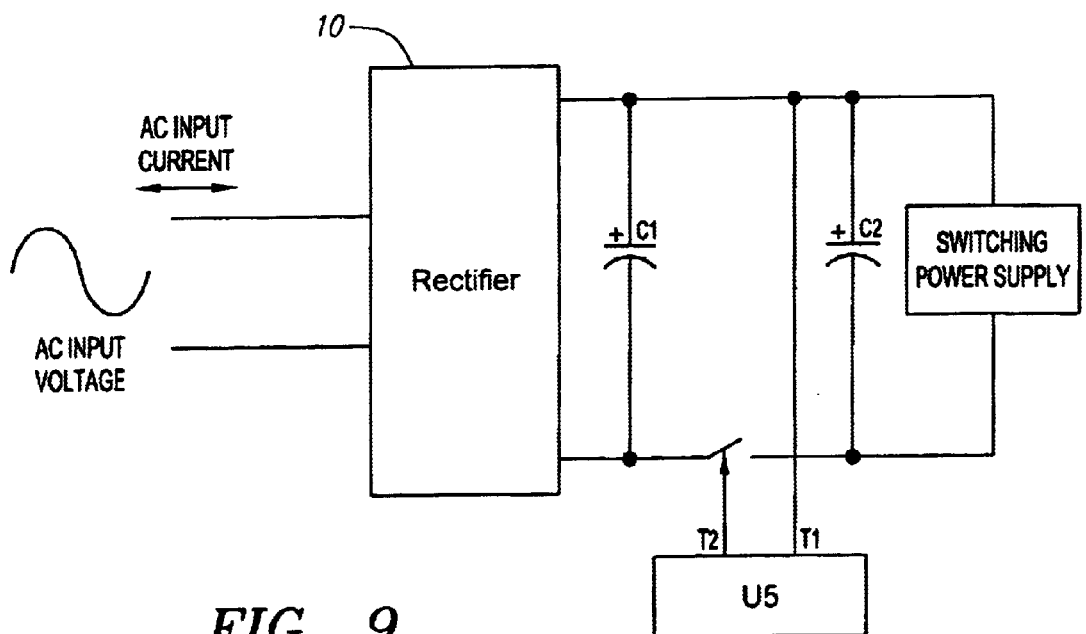

The high impedance insertion system 8 of FIG. 2a may be partitioned in various ways for construction as an integrated circuit. For example, FIGS. 5a and 5b each show an integrated circuit U1 containing controller 18, diode bridge rectifier 10, and switch 12 of system 8. Capacitors C1, C2 and the load (in this case, a switching power supply) are external to integrated circuit U1. Integrated circuit U1 of FIG. 5a locates its switch 12 on the negative rail between capacitors C1 and C2 whereas integrated circuit U1 of FIG. 5b locates its switch 12 on the positive rail between capacitors C1 and C2. A similar partitioning for high impedance insertion system 8 of FIG. 2b is shown in integrated circuit U2 of FIG. 6. It will be appreciated that the high impedance insertion system of the present invention may be partitioned into an integrated circuit in numerous other ways, as illustrated in FIGS. 7, 8, and 9. In FIG. 7, integrated circuit U3 contains controller 16 and diode bridge rectifier 10. In FIG. 8, integrated circuit U4 contains controller 16 and switch 12. In FIG. 9, integrated circuit U5 comprises controller 16.

It will be appreciated that the partitioning of the high impedance insertion system into an integrated circuit may be such that it combines naturally with other power supply components. For example, should the load be a switching power supply, the controller 16 may be integrated with a typical switching power supply controller.

Figure 1B:
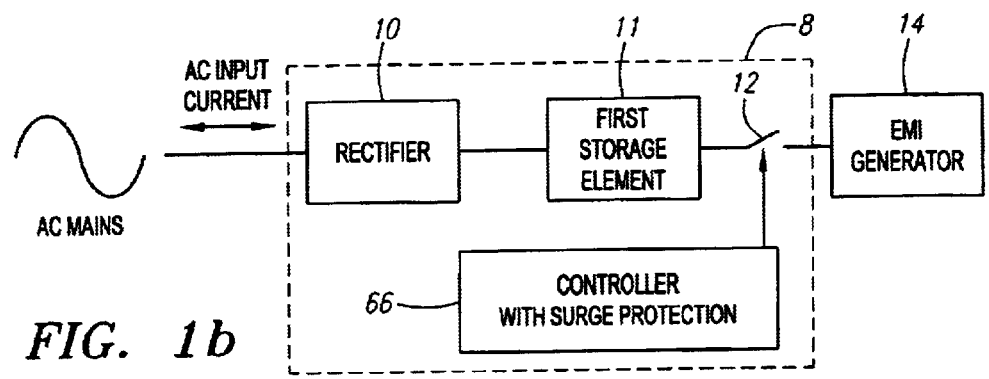
FIG. 1b is a conceptual block diagram of the high impedance insertion system of FIG. 1a modified to provide surge protection.
Figure 1C:
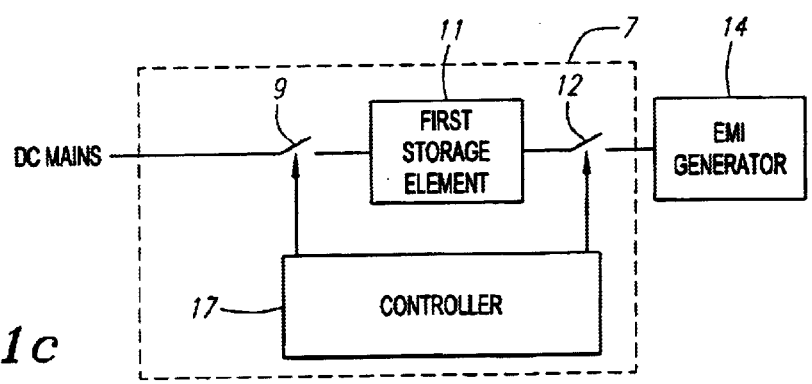
FIG. 1c is a conceptual block diagram of a high impedance insertion system for blocking EMI from coupling to a DC power source according to one embodiment of the invention.

In addition to protecting an AC source from EMI, the present invention may also protect the load from power surges in the AC source. For example, FIG. 1b illustrates a controller 66 configured to provide surge protection. For example, consider a voltage/current surge coming from the AC mains. Controller 66 will detect voltage across first storage element 11. In the event of a voltage surge, controller 66 will prevent switch 12 from turning ON, thereby protecting voltage over-stress of the power supply components. Once normal voltage levels are maintained, controller 66 returns to normal operation.

Moreover, although discussed with respect to a full-wave diode bridge rectifier, a half-wave rectifier could also be implemented with the present invention, at the cost of some power efficiency. In addition, the rectifier need not be constructed solely with diodes, "superdiodes" using op-amps may also be implemented. Furthermore, although high impedance insertion system 8 has been discussed with respect to the embodiment shown in FIG. 2a, wherein capacitor C1 serves as a first storage element, other types of storage elements may be utilized. In general, capacitors C1 and C2 may be replaced by other types of reactive elements. For example, inductors could be used to store energy for transfer to load 14. Accordingly, although the invention has been described with reference to particular embodiments, the description is only an example of the invention's application and should not be taken as a limitation. Consequently, various adaptations and combinations of features of the embodiments disclosed are within the scope of the invention as encompassed by the following claims.

We claim:

1. A high impedance insertion system, comprising:
a first storage element;
a rectifier for receiving an AC input and charging the first storage element, wherein the rectifier cyclically alternates between a high impedance state and a low impedance state in response to cycles of the AC input;
a bi-state device for coupling between the first storage element and a load capable of producing EMI, wherein the bi-state device is configured to switch between a high impedance state and a low impedance state, and
a controller for driving the bi-state device to switch to either the high impedance state or the low impedance state, the controller configured to drive the bi-state device such that, when the rectifier is in the low impedance state, the bi-state device is in the high-impedance state so as to electrically isolate the AC input from the EMI produced by the load.

2. The high impedance insertion system of claim 1, wherein the load includes a second storage element such that the second storage element is charged by the first storage element when the bi-state device is in the low impedance state.

3. The high impedance insertion system of claim 2, wherein the first and second storage elements each comprises a capacitor and the bi-state device comprises a switch.

4. The high impedance insertion system of claim 3, wherein the AC input is provided by an AC main and the switch comprises a field effect transistor.

5. The high impedance insertion system of claim 1, wherein the controller is configured to detect whether the charge on the first storage element exceeds a surge threshold and, in response to detecting that the surge threshold has been exceeded, to drive the bi-state device into the high impedance state, whereby the load is protected from power surges in the AC input.

6. A method of blocking a noise generator's EMI from coupling to an AC power source, comprising:

(a) cyclically energizing a first storage element using the AC power source; and alternating between:
(b) coupling a second storage element to the energized first storage element so that the second storage element may provide power to the noise generator; and
(c) electrically isolating the second storage element from the first storage element;
wherein the alternation of acts (b) and (c) is synchronized with the cycles of act (a) such that the first storage element is energized during substantially the same periods as when the second storage element is electrically isolated from the first storage element, whereby EMI from the noise generator is prevented from coupling into the AC power source.

7. The method of claim 6, wherein the AC power source is an AC main power source, the first storage element comprises a first capacitor, and the second storage element comprises a second capacitor.

8. The method of claim 7, further comprising:
(d) rectifying the AC main power source to provide a full-wave rectified output, wherein the cycles of act (a) are responsive to cycles in the full-wave rectified output.

9. The method of claim 8, further comprising:
(e) cycling a switch coupled between the first and second capacitors ON and OFF, wherein when the switch is cycled ON, act (b) occurs, and wherein when the switch is cycled OFF, act (c) occurs.

10. The method of claim 9, further comprising:
detecting whether the charge on the first capacitor exceeds a surge level; and
if the surge level is exceeded, cycling the switch OFF until the charge on the first capacitor is below the surge level, whereby the noise generator is protected from power surges in the AC main.

11. A device, comprising:
first and second terminals for coupling to a power source;
third and fourth terminals for coupling to a load capable of generating EMI and for coupling to a capacitor;
fifth terminal for coupling to the capacitor; and
means coupled to the first, second, third, fourth, and fifth terminals for cycling between (a) charging the capacitor from the power source and (b) coupling the capacitor to the load, wherein the means is configured to electrically isolate the power source from the load during the charging of the capacitor.

12. The device of claim 11, wherein the first and second terminals are coupled to the power source through a sense circuit.

13. A device, comprising:
first and second terminals for coupling to a power source;
a third terminal for coupling to load capable of generating EMI and for coupling to a capacitor;
a fourth terminal for coupling to the capacitor;
a fifth terminal for controlling a switch, wherein the switch, when ON, couples the capacitor to the load; and
means coupled to the first, second, third, fourth, and fifth terminals for driving the fifth terminal to cycle the switch ON and OFF so as to alternate between: a) charging the capacitor from the power source, and b) coupling the capacitor to the load, the means being configured to electrically isolate the power source from the load during the charging of the capacitor.

14. The device of claim 13, wherein the first and second terminals are coupled to the power source through a sense circuit.

* * * * *